US010235217B2

(12) United States Patent
Carey et al.

(10) Patent No.: US 10,235,217 B2
(45) Date of Patent: Mar. 19, 2019

(54) SYSTEM AND METHOD FOR AGGREGATE DATA FROM MULTIPLE SOURCES TO PROVIDE A SINGLE CIM OBJECT

(71) Applicant: Oracle International Corporation, Redwood Shores, CA (US)

(72) Inventors: Jon Carey, Spanish Fork, UT (US); Bart Wise, Orem, UT (US); Norman W. Paxton, Pleasant Grove, UT (US)

(73) Assignee: Oracle International Corporation, Redwood Shores ( * ) Notice: Subject to any disclaimer, the term of this patent is extended or adjusted under 35 U.S.C. 154(b) by 349 days.

(21) Appl. No.: 14/263,890

(22) Filed: Apr. 28, 2014

(65) Prior Publication Data

US 2014/0237485 A1    Aug. 21, 2014

Related U.S. Application Data

(63) Continuation of application No. 11/376,907, filed on Mar. 16, 2006, now Pat. No. 8,739,184.

(51) Int. Cl.
*G06F 9/54* (2006.01)
*H04L 12/24* (2006.01)

(52) U.S. Cl.
CPC ............ *G06F 9/54* (2013.01); *H04L 41/0233* (2013.01)

(58) Field of Classification Search
None
See application file for complete search history.

(56) References Cited

U.S. PATENT DOCUMENTS

| 6,560,591 B1 | 5/2003 | Memmott et al. |
| 6,965,932 B1 * | 11/2005 | Rajaram ............ H04L 41/0233 709/217 |
| 2002/0107872 A1 | 8/2002 | Hudis et al. |
| 2002/0194415 A1 * | 12/2002 | Lindsay et al. ............... 710/305 |
| 2003/0055948 A1 * | 3/2003 | Wang ............................ 709/224 |

OTHER PUBLICATIONS

Bumpus, Winston. "SMASH simplifies server management" from Network World dated Nov. 8, 2004. 8 pages.*

* cited by examiner

*Primary Examiner* — Shih-Wei Kraft
(74) *Attorney, Agent, or Firm* — Kilpatrick Townsend & Stockton, LLP

(57) ABSTRACT

Method and system for aggregating data regarding a system component from multiple data sources to provide a single aggregated Common Information Model ("CIM") object are described. In one embodiment, the method comprises requesting data regarding a system component from a first one of the data sources; upon receipt of the requested system component data from the first one of the data sources, updating an aggregate CIM object for the system component using the received system component data in accordance with a priority of the first one of the data sources relative to the remaining data sources; and repeating the requesting and updating in connection with each of the remaining data sources in accordance with a relative priority of the remaining data source.

7 Claims, 3 Drawing Sheets

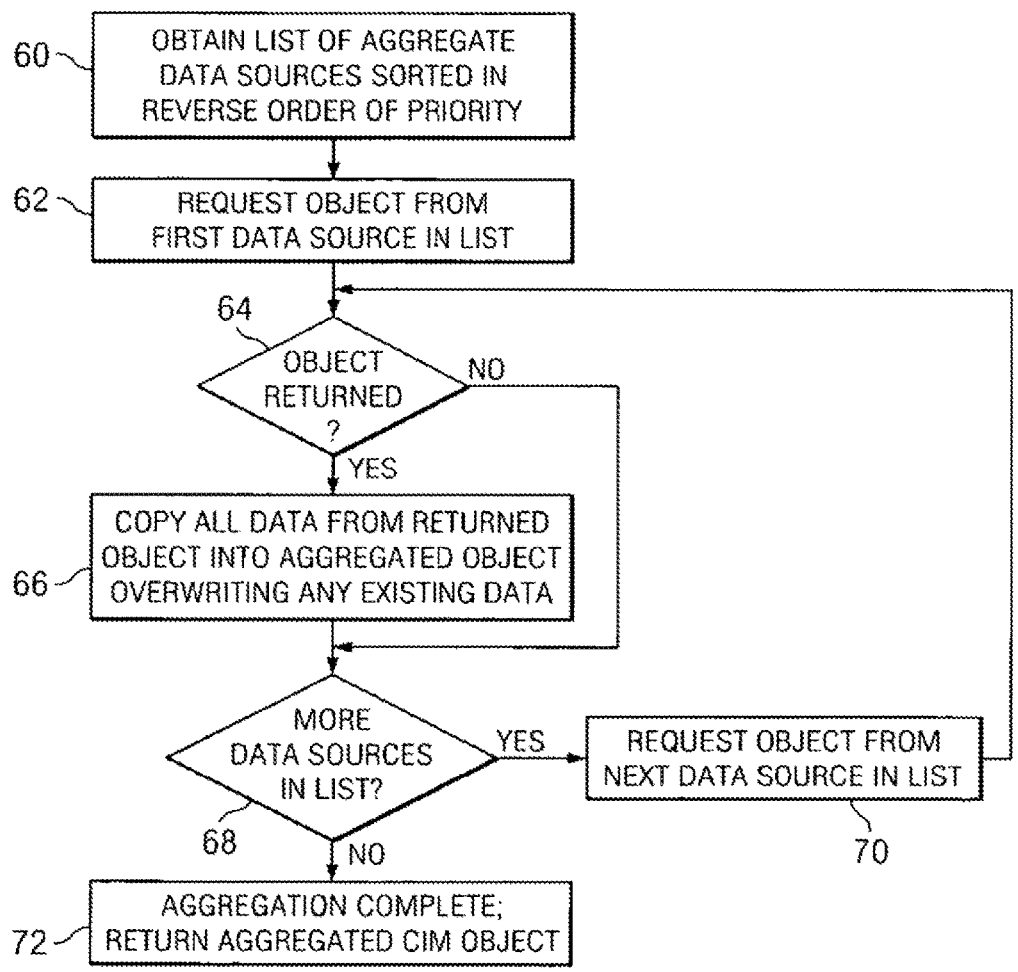

SYSTEM AND METHOD FOR AGGREGATE DATA FROM MULTIPLE SOURCES TO PROVIDE A SINGLE CIM OBJECT

RELATED APPLICATION DATA

This application is a continuation of U.S. patent application Ser. No. 11/376,907, filed Mar. 16, 2006, now allowed, which is incorporated by reference herein for all purposes.

BACKGROUND

Common Information Model ("CIM") is a standard set forth by the Distributed Management Task Force ("DMTF") that allows for a common model of providing information regardless of hardware or operating system ("OS") platform. CIM provides a common definition of management information for systems, networks, applications and services and allows for vendor extensions thereto. CIM is a vendor-agnostic industry management standard. A CIM object manager ("CIMOM") is essentially a server for servicing CIM requestsA Common Information Model ("CIM") provider provides on a CIM platform data representing a single entity. In the case of hardware, there will theoretically be an instance of a CIM object representing each component, including, for example, each processor, video card, etc. Hardware data is derived from multiple sources, including, but not limited to, Intelligent Platform Management Interface ("IPMI"), Hardware Abstraction Layer ("HAL"), System Management BIOS ("SMBIOS"), sysfs, and proprietary third party sources. Each of these sources has its own interface, some of which are very complex. There could be a representation of each component in only one, many, or all of the available data sources.

CIM promises a single interface to obtain the information about such components; however, the CIM provider requires a component profile provider to aggregate all of the data sources into a single CIM instance. This would traditionally require that for each component entity type (CIM provider), a profile provider would have to know how to interface with each of the data sources and aggregate that data into a single object.

SUMMARY

In response to these and other problems, in one embodiment, a method is provided for aggregating data regarding a system component from multiple data sources to provide a single aggregated Common Information Model ("CIM") object. The method comprises requesting data regarding a system component from a first one of the data sources; upon receipt of the requested system component data from the first one of the data sources, updating an aggregate CIM object for the system component using the received system component data in accordance with a priority of the first one of the data sources relative to the remaining data sources; and repeating the requesting and updating in connection with each of the remaining data sources in accordance with a relative priority of the remaining data source.

In another embodiment, the system comprises, for each of the data sources, means associated with the data source for responding to a request for a CIM object for a system component; and an aggregation module connected to each of the means for responding; wherein responsive to a request from a client application for a CIM object for a particular system component, the aggregation module receives a CIM object for the particular system component from each of the data sources and combines the received CIM objects into a single aggregated CIM object for the particular system component.

In still another embodiment, the system comprises means for requesting data regarding a system component from a first one of the data sources; and means responsive to receipt of the requested system component data from the first one of the data sources for updating an aggregate CIM object for the system component using the received system component data in accordance with a priority of the first one of the data sources relative to the remaining data sources; wherein the requesting and updating are repeated in connection with each of the remaining data sources in accordance with a relative priority of the remaining data source.

BRIEF DESCRIPTION OF THE DRAWINGS

FIG. 3 illustrates an embodiment of a method for aggregating data from multiple objects regarding a system component to provide a single CIM object to a client application.

DETAILED DESCRIPTION OF THE EMBODIMENTS

Figure 1:
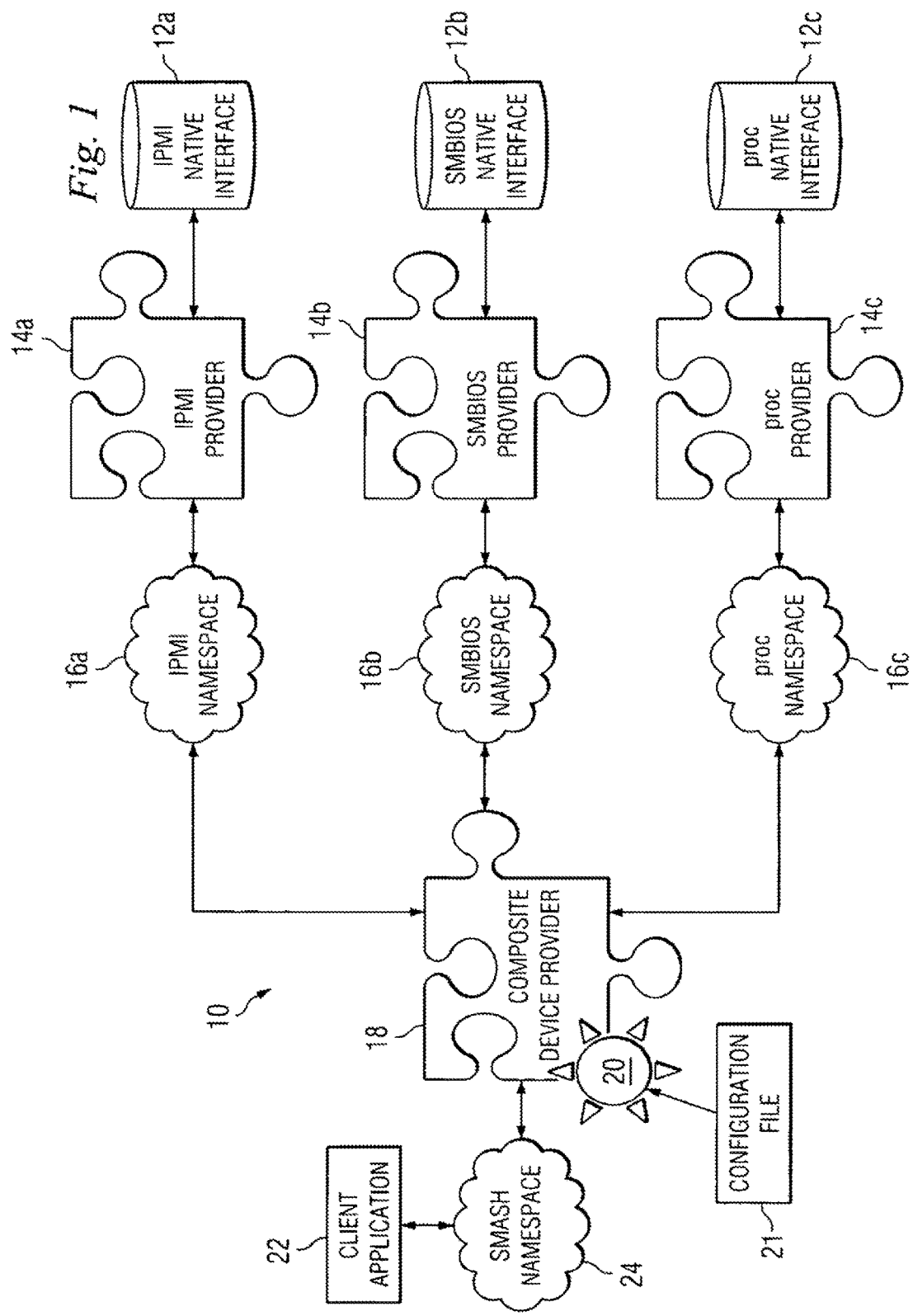
FIG. 1 illustrates an embodiment of a system for aggregating data from multiple objects regarding a system component to provide a single CIM object to a client application.

This disclosure relates generally to CIM objects and, more specifically, to a system and method for aggregating data from multiple CIM objects regarding a system component to provide a single aggregated CIM object to a client application. It is understood, however, that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, in one embodiment, a system 10 enables aggregation of data concerning a single system component from multiple data sources for the purpose of providing a single aggregated CIM object to a client application. As illustrated in FIG. 1, the system 10 includes one or more data sources, represented in FIG. 1 by data sources 12a-12c, each of which comprise a native data source interface for a different provider. For example, the data source 12a comprises a native data source interface for IPMI, the data source 12b comprises a native data source interface for SMBIOS, and the data source 12c comprises a native data source interface for a third party designated "proc". It will be recognized that, for each type of system component, a common model of possible data about that component is derived; this is referred to as the common CIM schema. Each of the data sources 12a, 12b, 12c, stores data for each of a number of system components. It will be recognized that the information included in each of the interfaces for a particular hardware element will be dependent on the corresponding source.

For each of the data sources 12a-12c, a separate CIM provider, comprising a CIMOM plug-in module, is provided for publishing the data it knows about the various types of system components into its own CIM namespace. In particular, one or more IPMI providers, represented in FIG. 1 by an IPMI provider 14a, publishes all of the data it knows about all system components from IPMI into appropriate component objects in an IPMI namespace 16a. Similarly, one or more SMBIOS providers, represented in FIG. 1 by an SMBIOS provider 14b, publishes all of the data it knows about all system components from SMBIOS into appropriate component objects in an SMBIOS namespace 16b and a proc provider 14c publishes all of the proprietary data it possesses about all system components into appropriate component objects in a proc namespace 16c. It will be recognized that, although only three providers are illustrated in FIG. 1, there may be more or fewer providers in alternative embodiments.

A composite data provider 18 includes an aggregation module 20, the function of which is to provide awareness of all of the namespaces 16a-16c and to aggregate information from those namespaces. The aggregation module 20 uses configuration settings, which may be specified in a configuration file 21, to know which namespaces to aggregate, as well as for configuration settings for precedence rules, such as which namespace is deemed more accurate than others if there is conflicting data. Additionally, the aggregation module 20 uses "deviceIDs" that contain both an entity type and an instance number to identify which devices from each namespace are common and should be aggregated. Finally, the aggregation module 20 publishes one common instance for each instance that exists in at least one of the namespaces 16a-16c. This single instance provides all known information with regard to a single system component without regard to the origin of that information.

In operation, and as more fully described below, a client application 22 makes a request to a System Management Architecture for Server Hardware ("SMASH") namespace 24 for data regarding a system component. In accordance with features of one embodiment, the response from the SMASH namespace 24 to this request comprises an aggregated CIM object.

Figure 2:
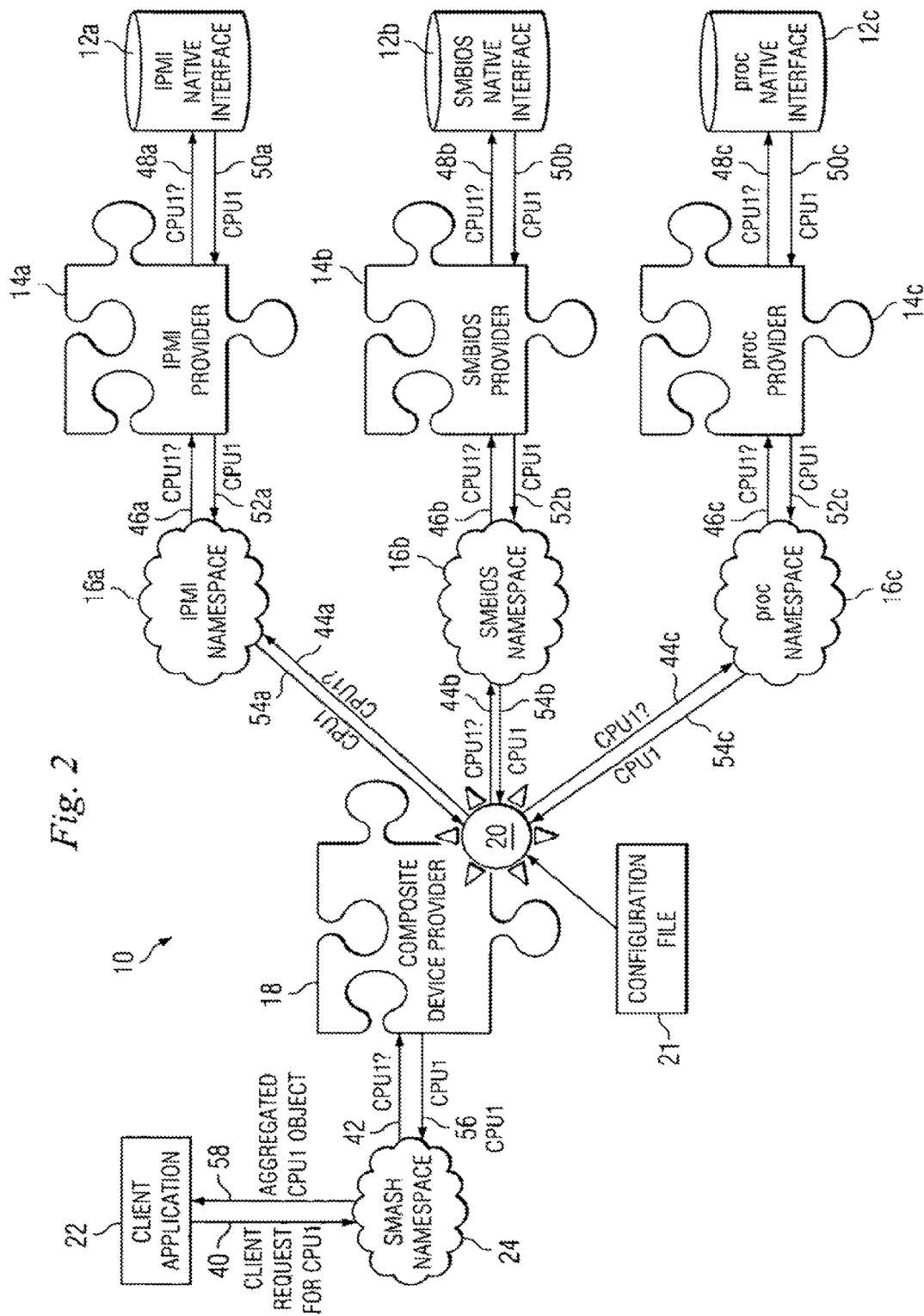
FIG. 2 is a flow diagram of the system of FIG. 1 in accordance with one embodiment.

Referring now to FIG. 2, operation of the system 10 in accordance with one embodiment in response to a request from a client application will be described. The process is initiated with a request 40 from the client 22 to the SMASH namespace 24 for data regarding a system component designated "CPU1". The SMASH namespace 24 submits a corresponding request 42 to the aggregation module 20 of the composite device provider 18, which in turn queries the namespaces 16a, 16b, 16c, via requests 44a, 44b, and 44c, respectively. Each of the namespaces 16a, 16b, 16c, queries its respective data sources 12a, 12b, 12c, via the respective provider 14a, 14b, 14c, as represented by arrows 46a, 46b, 46c, and 48a, 48b, 48c. In response to the query from the respective namespace 16a, 16b, 16c, each of the data sources 12a, 12b, 12c, provides data stored therein regarding the specified hardware element, e.g., CPU1, as represented by arrows 50a, 50b, 50c, and 52a, 52b, 52c. The namespaces 16a, 16b, 16c, return this data to the aggregation module 20, as represented by arrows 54a, 54b, 54c.

The data returned to the aggregation module 20 from each of the namespaces 16a, 16b, 16c, comprises a CIM object. Each of the CIM objects is populated differently, depending on the data source from which it was derived. In one embodiment, as will be described in detail below, the aggregation module 20 aggregates the CIM objects received from the namespaces 16a, 16b, 16c, in a manner specified by the configuration file 21, which indicates, among other things, an order of precedence among the data sources 12a, 12b, 12c. The aggregated CIM object is returned to the SMASH namespace 24, as represented by an arrow 56. The SMASH namespace 24 provides the aggregated CIM object to the client application 22, as represented by an arrow 58.

FIG. 3 is a flowchart illustrating a method aggregating data from multiple objects regarding a single component to provide an aggregated CIM object to a client application. As shown in FIG. 3, in step 60, a list of aggregate data sources, sorted in reverse order of priority, is obtained. Using the system 10 shown in FIGS. 1 and 2 as an example, the list of data sources would include the IPMI data source 12a, the SMBIOS data source 12b, and the proc data source 12c. For the sake of example, it will be assumed that the configuration file 21 specifies that the IPMI data source 12a is the highest priority, the SMBIOS data source 12b is the second highest priority, and the proc data source 12c is the lowest priority among the data sources; therefore, the proc data source would be listed first, the SMBIOS data source would be listed second, and the IPMI data source would be listed last. In step 62, beginning with the first listed data source, the CIM object for the component of interest is requested from the data source. The process of requesting and obtaining the specified object from the data source is detailed above with reference to FIG. 2. Using the example illustrated in FIG. 2 and the order of priority specified above, the result of step 62 would be that a CPU1 object is requested from the proc data source 12a.

In step 64, a determination is made whether the requested object exists in the data source; that is, whether the object has been returned from the data source. If so, in step 66, all data from the returned object is copied into an aggregated object for the component of interest. In performing step 66, any existing data in the aggregated object is overwritten with data included in the returned object. As previously noted, the data sources are processed in reverse order of priority, thus ensuring that the data provided by the data source with the highest order of priority is included in the aggregated object. If a negative determination is made in step 64, execution proceeds directly to step 68. In step 68, a determination is made whether there are more data sources in the list of data sources from which to request CIM objects. If so, in step 70, the CIM object for the component of interest is requested from next data source and steps 64-70 are repeated for each of the remaining data sources. If a negative determination is made in step 68, execution proceeds to step 72. In step 72, the aggregation is complete and the aggregated object is returned to the client application, as described with reference to FIG. 2.

It will be recognized that, as opposed to being sorted in reverse order of priority, the list of aggregate data sources obtained in step 60 may be sorted in order of priority, in which case, in step 66, the only data that will be copied from the returned object into the aggregated object will be data that does not already exist in the aggregated object.

While the preceding description shows and describes one or more embodiments, it will be understood by those skilled in the art that various changes in form and detail may be made therein without departing from the spirit and scope of the present disclosure. For example, various steps of the described methods may be executed in a different order or executed sequentially, combined, further divided, replaced with alternate steps, or removed entirely. In addition, various functions illustrated in the methods or described elsewhere in the disclosure may be combined to provide additional and/or alternate functions. Therefore, the claims should be interpreted in a broad manner, consistent with the present disclosure.

What is claimed is:

1. A method comprising:

receiving, by an aggregation module, a request of a client application to provide a Common Information Model ("CIM") object comprising data relating to an individual hardware component, the request identifying an entity type and instance identifier of the individual hardware component;

retrieving, by the aggregation module and from a configuration file, configuration settings including a plurality of device identifiers corresponding to a plurality of data sources from which to request data relating to the individual hardware component, each device identifier containing an entity type and an instance identifier;

determining, by the aggregation module, either a forward or reverse priority to be used for each of the plurality of data sources with respect to other data sources, based on the configuration settings within the configuration file;

for each particular data source in the plurality of data sources, performing, by the aggregation module:

(i) transmitting a request for data stored by the particular data source relating to the individual hardware component, the request identifying the entity type and the instance identifier of the individual hardware component, wherein transmitting the request comprises transmitting a CIM Object Manager ("CIMOM") namespace associated with the particular data source;

(ii) receiving, in response to the request for data, a CIM object containing data from the particular data source relating to the individual hardware component; and (iii) based on the determined forward or reverse priority of the particular data source with respect to the other data sources, copying none of the data, some of the data, or all of the data within the received CIM object into an aggregated CIM object, wherein said copying comprises:

(a) when the priority determined based on the configuration settings within the configuration file comprises a reverse priority, overwriting any existing data in the aggregated CIM object that conflicts with the data in the received CIM object containing data from the particular data source; or (b) when the priority determined based on the configuration settings within the configuration file comprises a forward priority, retaining any existing data in the aggregated CIM object that conflicts with the data in the received CIM object containing data from the particular data source, and copying from the received CIM object into the aggregated CIM object only data not previously existing in the aggregated object, wherein:

when the priority determined based on the configuration settings within the configuration file comprises a reverse priority, (i)-(iii) are performed in order of increasing relative priority of the data sources, with respect to the other data sources, and when the priority determined based on the configuration settings within the configuration file comprises a forward priority, (i)-(iii) are performed in order of decreasing relative priority of the data sources, with respect to the other data sources; and after performing (i)-(iii) for each of the plurality of data sources, returning the aggregated CIM object to the client application.

2. The method of claim 1, wherein (i)-(iii) are performed sequentially for the plurality of data sources, such that (i)-(iii) are performed for a particular data source in response to a completion of (i)-(iii) for a previous data source.

3. The method of claim 2, further comprising:

transmitting an additional request for a CIM object relating to the individual hardware component to an additional data source;

determining the requested CIM object does not exist at the additional data source; and in response to determining the requested CIM object does not exist at the additional data source, transmitting a request for a CIM object relating to the individual hardware component to a next data source.

4. A system comprising:

a processing unit comprising one or more processors; and memory coupled with and readable by the processing unit and storing therein a set of instructions which, when executed by the processing unit, causes the system to:

receive a request of a client application to provide a Common Information Model ("CIM") object comprising data relating to an individual hardware component, the request identifying an entity type and instance identifier of the individual hardware component;

retrieve, a configuration file, configuration settings including a plurality of device identifiers corresponding to a plurality of data sources from which to request data relating to the individual hardware component, each device identifier containing an entity type and an instance identifier;

determine either a forward or reverse priority to be used for each of the plurality of data sources with respect to other data sources, based on the configuration settings within the configuration file;

for each particular data source in the plurality of data sources:

(i) transmit a request for data stored by the particular data source relating to the individual hardware component, the request identifying the entity type and the instance identifier of the individual hardware component, wherein transmit the request comprises transmitting a CIM Object Manager ("CIMOM") namespace associated with the particular data source;

(ii) receive, in response to the request for data, a CIM object containing data from the particular data source relating to the individual hardware component; and (iii) based on the determined forward or reverse priority of the particular data source with respect to the other data sources, copy none of the data, some of the data, or all of the data within the received CIM object into an aggregated CIM object, wherein said copy comprises:

(a) when the priority determined based on the configuration settings within the configuration file comprises a reverse priority, overwrite any existing data in the aggregated CIM object that conflicts with the data in the received CIM object containing data from the particular data source; or
(b) when the priority determined based on the configuration settings within the configuration file comprises a forward priority, retain any existing data in the aggregated CIM object that conflicts with the data in the received CIM object containing data from the particular data source, and copy from the received CIM object into the aggregated CIM object only data not previously existing in the aggregated object,
wherein:
when the priority determined based on the configuration settings within the configuration file comprises a reverse priority, (i)-(iii) are performed in order of increasing relative priority of the data sources, with respect to the other data sources, and
when the priority determined based on the configuration settings within the configuration file comprises a forward priority, (i)-(iii) are performed in order of decreasing relative priority of the data sources, with respect to the other data sources; and
after performing (i)-(iii) for each of the plurality of data sources, returning the aggregated CIM object to the client application.

5. The system of claim 4, wherein (i)-(iii) are performed sequentially for the plurality of data sources, such that (i)-(iii) are performed for a particular data source in response to a completion of (i)-(iii) for a previous data source.

6. The system of claim 5, the memory storing therein further instructions which, when executed by the processing unit, causes the system to:
transmit an additional request for a CIM object relating to the individual hardware component to an additional data source;
determine the requested CIM object does not exist at the additional data source; and
in response to determining the requested CIM object does not exist at the additional data source, transmit a request for a CIM object relating to the individual hardware component to a next data source.

7. A computer-program product tangibly embodied in a non-transitory machine-readable storage medium, including instructions configured to cause one or more data processors to perform actions including:
receiving a request of a client application to provide a Common Information Model ("CIM") object comprising data relating to an individual hardware component, the request identifying an entity type and instance identifier of the individual hardware component;
retrieving, from a configuration file, configuration settings including a plurality of device identifiers corresponding to a plurality of data sources from which to request data relating to the individual hardware component, each device identifier containing an entity type and an instance identifier;
determining either a forward or reverse priority to be used for each of the plurality of data sources with respect to other data sources, based on the configuration settings within the configuration file;
performing, for each particular data source in the plurality of data sources:
(i) transmitting a request for data stored by the particular data source relating to the individual hardware component, the request identifying the entity type and the instance identifier of the individual hardware component, wherein transmitting the request comprises transmitting a CIM Object Manager ("CIMOM") namespace associated with the particular data source;
(ii) receiving, in response to the request for data, a CIM object containing data from the particular data source relating to the individual hardware component; and
(iii) based on the determined forward or reverse priority of the particular data source with respect to the other data sources, copying none of the data, some of the data, or all of the data within the received CIM object into an aggregated CIM object, wherein said copying comprises:
(a) when the priority determined based on the configuration settings within the configuration file comprises a reverse priority, overwriting any existing data in the aggregated CIM object that conflicts with the data in the received CIM object containing data from the particular data source; or
(b) when the priority determined based on the configuration settings within the configuration file comprises a forward priority, retaining any existing data in the aggregated CIM object that conflicts with the data in the received CIM object containing data from the particular data source, and copying from the received CIM object into the aggregated CIM object only data not previously existing in the aggregated object,
wherein:
when the priority determined based on the configuration settings within the configuration file comprises a reverse priority, (i)-(iii) are performed in order of increasing relative priority of the data sources, with respect to the other data sources, and
when the priority determined based on the configuration settings within the configuration file comprises a forward priority, (i)-(iii) are performed in order of decreasing relative priority of the data sources, with respect to the other data sources; and
after performing (i)-(iii) for each of the plurality of data sources, returning the aggregated CIM object to the client application.

* * * * *